United States Patent [19]

Schwarz et al.

[11] Patent Number: 4,960,450

[45] Date of Patent: Oct. 2, 1990

[54] SELECTION AND PREPARATION OF ACTIVATED CARBON FOR FUEL GAS STORAGE

[75] Inventors: James A. Schwarz, Fayetteville; Joong S. Noh, Syracuse, both of N.Y.; Rajiv K. Agarwal, Las Vegas, Nev.

[73] Assignee: Syracuse University, Syracuse, N.Y.

[21] Appl. No.: 409,437

[22] Filed: Sep. 19, 1989

[51] Int. Cl.[5] .................................................. F25J 3/02
[52] U.S. Cl. ............................................ 62/18; 62/462
[58] Field of Search .................................... 62/18, 46.2

[56] References Cited

U.S. PATENT DOCUMENTS

| | | | |
|---|---|---|---|
| 3,542,525 | 11/1970 | Pigford et al. | 62/18 |
| 3,566,611 | 3/1971 | Sterrett | 62/18 |
| 3,725,299 | 4/1973 | Turnock et al. | 62/18 |
| 4,022,348 | 5/1977 | Solomon | 222/3 |
| 4,409,102 | 10/1983 | Tannar | 210/603 |
| 4,566,281 | 1/1986 | Sandrock et al. | 62/46.2 |
| 4,580,404 | 4/1986 | Pez et al. | 62/46.2 |
| 4,633,372 | 12/1986 | Calahan et al. | 361/433 |
| 4,716,736 | 1/1988 | Schwarz | 62/46.2 |
| 4,746,332 | 5/1988 | Tomomura et al. | 62/18 |
| 4,750,925 | 6/1988 | MacLean et al. | 62/18 |

OTHER PUBLICATIONS

Effect of Surface Acidity of Activated Carbon on Hydrogen Storage, Agarwal, et al. Carbon vol. 25, No. 2 pp. 219-226 1987.
Estimation of the Point Zero Charge of Simple Oxides by Mass Titration Noh et al., Journal of Colloid and Interface Science, vol. 130 pp. 157-164 1989.

*Primary Examiner*—Ronald C. Capossela
*Attorney, Agent, or Firm*—Wall and Roehrig

[57] ABSTRACT

Increasing the surface acidity of active carbons can lead to an increase in capacity for hydrogen adsorption. Increasing the surface basicity can facilitate methane adsorption. The treatment of carbons is most effective when the carbon source material is selected to have a low ash content i.e., below about 3%, and where the ash consists predominantly of alkali metals alkali earth, with only minimal amounts of transition metals and silicon. The carbon is washed in water or acid and then oxidized, e.g. in a stream of oxygen and an inert gas at an elevated temperature.

10 Claims, 2 Drawing Sheets

SELECTION AND PREPARATION OF ACTIVATED CARBON FOR FUEL GAS STORAGE

BACKGROUND OF THE INVENTION

This invention relates to the preparation of activated carbons and is more particularly directed to a process for enhancing the capacity of carbon for storage of hydrogen or other gases.

Activated carbons are high-surface-area materials that possess surface functional groups that can be manipulated by chemical treatment. As a class of sorbents, activated carbons are an attractive medium for storage of alternative fuels such as hydrogen and methane. The combined effects of high surface area and surface functional groups can lead to an enhanced storage capacity.

Hydrogen storage in carbon has been described, e.g., in U.S. Pat. No. 4,716,736. However, not all carbons possess the capability of having their storage capacity enhanced significantly, and in the past this capability has not been understood or predictable.

A previous publication, Agarwal et al., "Effect of Surface Acidity of Activated Carbon on Hydrogen Storage", *Carbon*, Vol. 25, No. 2, 219–226 (1987) describes hydrogen adsorption studies at 78 K. and pressures up to 40 atm using a variety of commercially available active carbons. Surface modification consisted of increasing the surface acidity by an oxidation treatment. It was noted that the amount of hydrogen adsorbed increased with increased surface acidity of the active carbons. However, this early treatment failed to recognize that the nature and quantity of impurities in the starting carbon material were of any significance, and thus offered no suggestions either as to selection of the carbon source material, or as to the treatment of the material prior to oxidation.

OBJECTS AND SUMMARY OF THE INVENTION

It is an object of this invention to increase the adsorptive capacity of active carbons.

It is a more specific object of this invention to provide a selection that accounts for easily measured properties of the carbon material and employs simple methods for determining optimum conditions for surface modification.

In accordance with one aspect of this invention, the process of enhancing the active carbon first involves selecting a suitable source carbon material that has a low ash content, i.e., on the order of 3% or below. Here ash is considered to be the non-carbonaceous material that remains as a residue when the carbon is completely oxidized. The ash should have relatively small contents of silicon and transition metals, i.e., on the order of 1000 μg/g and about 3000 μg/g, respectively, relative to the total carbon source. On the other hand, the ash should consist predominantly of alkali metals and alkali earths, i.e., sodium, potassium, calcium, magnesium, etc. The selected source carbon is washed in water or acid, preferably at an elevated temperature, to reduce the ash content and also to lower the pH of the carbon material.

Then, for increased hydrogen storage capacity the carbon is oxidized, e.g., in a flow of about 1% oxygen in nitrogen at 873 K. to 973 K. or in a flow of air at 653 K. to 693 K., to increase the number of acidic functional sites on the active carbon. To increase the capacity for storage of methane, the carbon is oxidized in air or an oxygen nitrogen mixture at a temperature or about 175° C. (448 K.) for about 48 hours. This produces a net increase in basic functional sites on the carbon. This modification affects only the surface functionalities, and does not affect the porosity or effective surface area.

By this method, the increased surface activity obtained for active carbons can lead to an increase in hydrogen storage capacity on the order of 30%, or 10% for methane.

Surface acidity can be increased by either controlled gaseous or controlled aqueous oxidation. The chemical treatments are most successful for carbons that have a low content of noncarbonaceous residue. For carbons of comparable effective surface area, enhancement up to 30% in storage capacity can be achieved, provided the ash content is below about 2%.

DESCRIPTION OF THE PREFERRED EMBODIMENT

Figure 1:
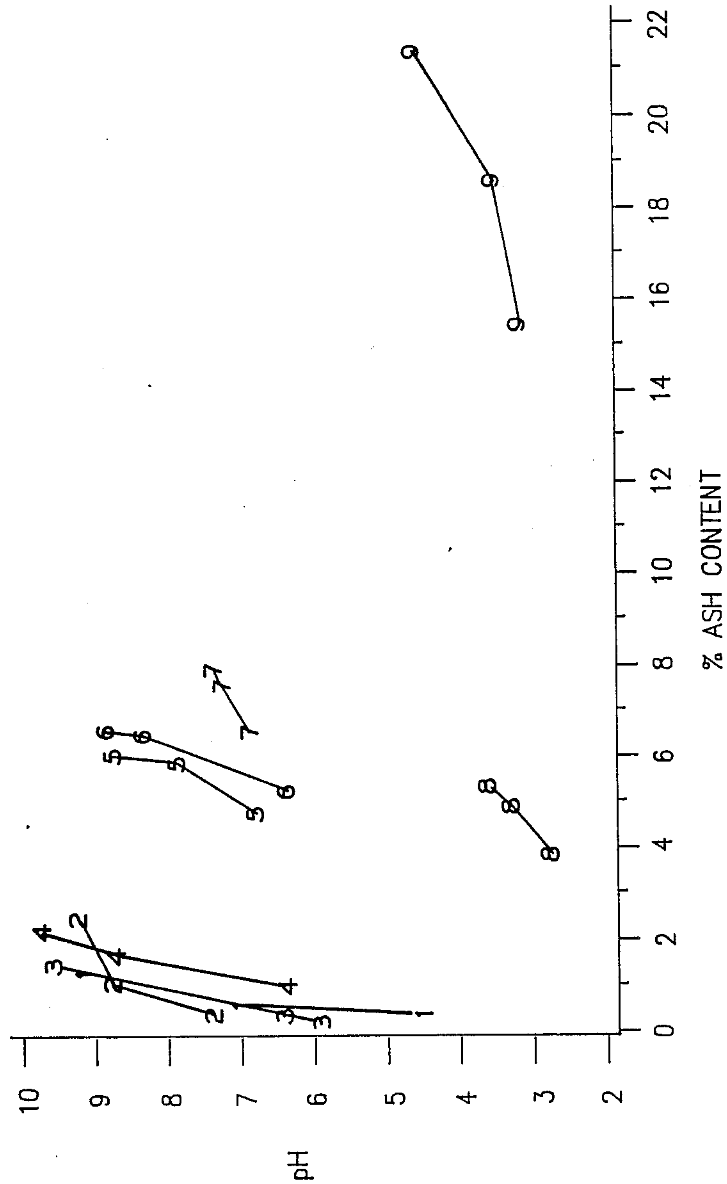
FIG. 1 is a plot of carbon pH versus ash content for various sample carbons.

Activated carbons find wide applications in such processes as gas adsorption, water treatment, and as catalytic supports. Activated carbons are built upon microcrystalline structures containing crystallites of various dimensions and with different orientations. Very often, there is a considerable content of disorganized internal structure composed of tetrahedrally bonded layers. A large amount of disrupted bonds are also present on the carbon surface forming highly reactive centers. Oxygen is known to chemisorb easily on these carbon surfaces to form carbon-oxygen complexes. Chemisorption of oxygen has been observed at temperatures as low as 260 K.

The oxygen complexes formed on the surface of activated carbons can be broadly classified into two categories: acidic oxides and basic oxides. In general, basic oxides are formed by oxidation above 1000 K. under air, steam or carbon dioxide activation; acidic oxides are formed at temperatures lower than 700 K., preferably by moist air oxidation. Carbons prepared at transition temperatures were found to have amphoteric properties Carbons which adsorb bases and were activated at low temperature ($<$700 K.) are referred to as "L" carbons; those activated at high temperature ($>$1000 K.) which adsorb acids as "H" carbons. It has been observed, however, most carbons are capable of adsorbing both acids and bases, though the adsorbed amounts differ. In fact, "L" carbons are properly designated because they demonstrate that acidic sites are the dominant species. "L" carbons appear to produce a bulk acidic suspension when placed in distilled water. On the other hand, "H" carbons have base-dominated sites; these carbons have a bulk alkaline property in water.

The presence of specific surface functional groups can exert a great effect on the adsorptive properties of activated carbons. It is difficult to formulate a complete inventory of all the possible surface groups because of the complexities in identifying the species and their composition. There have been, however, some approaches to this end using such measurements as electron spin resonance (ESR) and infrared (IR) analysis. In general, but not as specific rule, several correlations between the presence of acidic or basic surface groups and the adsorptive capacity for hydrocarbons have emerged. Also, acidity of solid oxide catalysts to a greater or lesser extent, correlated with their performance such as activity and selectivity. In this respect, the acidity or basicity measurement either by acid/base titration or pH in water suspension can provide indication of the surface properties of activated carbons relative to their adsorption propensity. For example, activated carbons of the same BET areas but demonstrating different pH values in aqueous suspension have a different adsorption capacity for hydrogen or for methane or another fuel gas. Recognizing the potential importance of improving storage capacity of hydrogen or methane for alternative fuel use, we have explored the possible limitations of employing surface modification by controlled oxidation on nine (9) commercially available carbons.

The effect of simple pretreatments of activated carbons can be correlated with the pH of the aqueous carbon suspension; the simple treatments consist of washing with water and hydrochloric acid. Then, using these data and following controlled oxidation of the resulting carbon surface at elevated temperatures, the pH's of the aqueous suspensions, as well as the amount of strong acid/base titer consumed, are examined. This provides an indication of the "distribution" of acid sites present on the carbon surface. Collectively these measurements provide a measure of the quantity (number) and quality (strength) of acid or basic sites generated during oxidation.

The impact of ash content on potential modification of carbon surface for improved adsorption capacity can then be appreciated. It is important to note that during such treatments, BET surface area of the activated carbons is not changed significantly.

ACID/BASE TITRATION AND pH

The neutralization equivalents of acid and base are often interpreted as a semi-quantitative measure of surface oxide functionalities. Although neutralization results by Boehm's method are not universally accepted as probative of the specific functional groups, it is believed that the amount of acid and base uptake determined by back titration is, to a large degree, a characteristic of a carbon surface with respect to the impact of controlled oxidation to modify surface functional groups.

The pH of an aqueous carbon suspension is normally considered to give a convenient semi-qualitative indication of the nature of the surface. The determination of the pH of an activated carbon is important in its own right. The influence or the carbon slurry pH on defining its suitable application in commercial processes is significant. For example, the suspension of the carbon in water should have a pH between 6 and 8 for sugar operations. Carbons suitable for use as carriers for metal-supported catalysts are often specified by the pH of their aqueous raffinate.

The pH of carbon, as measured in a suspension in distilled water, can be altered by oxidation treatment as well as by washing procedures with water or acid. For example, washing the carbon can remove the soluble ash content which results in altering the pH. The carbons studied here are divided into two generic groups: one group has ash which is easily removed resulting in a large change in pH; the other group has ash which is not significantly removed in quantity resulting in a smaller change in pH. The washing procedures are necessary when the intended use of carbon requires low soluble ash content. Thus it is important to know the impact of ash content of a carbon on this property change due to washing. This, in turn, can provide a rationale for selecting a proper carbon for surface modification for a specific application. The interpretation of pH changes and acid/base titration changes due to surface modification is discussed next.

SOLID ACIDITY

The concept that solid surfaces may be acidic originally arose from the observation that hydrocarbon reactions, such as cracking, that are catalyzed by acid-treated clays give rise to a different product distribution from those obtained by thermal reaction. These solid catalyzed reactions exhibit features similar to reactions catalyzed by mineral acids.

An acidic site may be either of the Bronstead type whereby it donates a proton or of the Lewis type where it acts as an electron acceptor. In any discussion about solid acidity three factors must be considered: the amount, the strength and the type of acid sites present. Although methods have been proposed to determine the type of acid sites (i.e., Bronstead or Lewis) they are not universally adaptable to all systems.

For activated carbons, determination of the amount of acidic sites might not necessarily be sufficient to characterize their surface properties with respect to adsorption. Surface modification procedures, such as oxidation, will change both the acidity and the basicity of the surface. The difference between the total acidity and basicity determined by strong acid/base titration reflects the overall impact of controlled oxidation on the adsorptive properties of activated carbons. Titration using strong reagents like sodium hydroxide and hydrochloric acid can measure the total amount of acid and/or basic sites. The use of a strong reagent ensures the acidic (basic) sites of all strengths are counted. In the case of hydrochloric acid, the total uptake might also contain a physisorbed contribution. This component is the same for those carbons of equal surface areas. Thus, difference in the exchange amount of this reagent reflect only changes in the acid/base properties developed during oxidation.

To determine the acidic groups of different strengths one needs to have a spectrum of base titers of various pK values such as proposed in Boehm's titration method. The principle is that a weak base titrates only stronger acid sites while a strong base can titrate both strong as well as weak acid sites.

The pH of the aqueous suspension of the same activated carbon subjected to varying intensities of controlled oxidation reflects the quantity and quality of acid sites generated. It is possible that insoluble ash components present on the surface will affect the pH. However, the effect will be the same for the same sample oxidized differently and thus the analysis will not be affected. For example, a change in pH of the sample due to different oxidation treatments could be interpreted as either a change in the number (quantity) of functional sites, a change in their speciation (quality), or both. However, if no pH change occurs, yet the number of functional sites increase, then the chemical composition of the acid or base site (quality) does not change. In all cases, the system behavior is dominated by the stronger acidic or basic groups. In the experimental study to be described below, we use the concepts developed to explore the impact of ash content on the surface properties of activated carbons following controlled oxidation treatments. The surface functionalities in the treated active carbons, i.e., the chemical properties of the oxide surface in contact with an aqueous environment is quite complex, and the surface exhibits complex ion exchange properties. However, the ion exchange capacity is related to the net surface charge carried by the carbon. The latter quantity is related to the surface pH, as the surface can function as a Bronstead acid or base.

A convenient measure of the propensity for the carbon surface to become either positively or negatively charge as a function of pH is the value of pH required to give zero net surface charge. This value is designated as the point of zero charge (pzc). This can be determined, for a given carbon, by a technique known as mass titration.

Mass titration is a method involving the measurement of the point of zero change (pzc). This can involve pzc measurement by a primary equilibrium method, as described in Tewari, P. H., and Campbell, A. B., *J. Colloid Interface Sci.*, Volume 55, Page 531 (1976), according to a method presented in Ahmed, S. M., *Canad. J. Chem.*, Volume 44, Page 1663 (1966).

This method is to find an equilibrium pH where the addition of solids into the fresh solution does not affect the pH of the solution. An arbitrary amount of solid is added to the solution and its pH changes are measured. This procedure is repeated using fresh solutions of various pH values until a pH is found where no pH change occurs with the addition of the solid; if the solid is added to a solution at the pH of the pzc, no change in pH should occur. Berube, Y. G., and DeBruyn, P. G., *J. Colloid Interface Sci.*, Volume 27, Page 305, (1967) proposed a similar procedure which involves observing the direction of the induced drift in pH. Variable amounts of solid were intermittently added and the drift in pH was measured. They mentioned that the accuracy of the pH drift method depends on the mass content of the solid in solution. However, no discussion was provided regarding the observed trend (of pH vs mass content) in their pH drift measurements. Both of these earlier works involve trial-and-error type procedures to find the "optimum" initial pH which does not give any pH shift. The most important fact in their observation is that if the solution pH is not the same as the solid pH at pzc, then the equilibrium pH after the addition of an solid shifts in the direction of the pH at pzc. It is evident then that if additional solid is added, the pH should approach the pH at pzc as seen qualitatively by the work of Berube and DeBruyn. This behavior is the basis of the mass titration concept. That is, starting with an initial $pH_o$ for carbon in water, the addition of solids will change the pH of the system until the pH asymptotically approaches the point of zero charge, $pH_{pzc}$.

EXPERIMENTAL

Treatment of carbon samples: Commercial activated carbon samples were used "as received" and after treatment in the following manner: One part of a sample was washed with distilled water in a soxhlet extraction apparatus for 18 hours and dried in an oven at 393 K. Another part was boiled in a 2M hydrochloric acid solution for one hour, washed with distilled water in the soxhlet apparatus and then dried in flowing nitrogen at 473 K. The use of this drying procedure should remove all the trapped hydrochloric acid. Oxidation of the various samples was carried out in the following manner. The samples were heated to 873 K. in flowing nitrogen in a quartz pipe heated by a furnace controlled by an LFE Temperature Programmer (Model No. 2011). All the gases used were supplied by Linde Gas Company and were of high purity grade. The oxidation was carried out by a 1% mixture of oxygen in nitrogen (obtained by mixing pure nitrogen in air) at 873–973 K. or by direct oxidation in flowing air at 653–693 K. The reduction was carried out in a hydrogen flow at 873 K. for 30 minutes. The cooling after oxidation was done in less than one minute. All samples were stored in a desiccator. The BET surface areas of all the carbon samples were measured after each oxidation treatment. It was observed that the surface areas were not significantly changed. The analysis of the results is not affected by any small changes in the pore structure of the activated carbons.

Carbon Analysis: A part of all the samples was sent to Micro Analysis Inc., Delaware, for elemental analysis. The analysis obtained was on a dry basis. The total ash content of each carbon was determined by heating a predetermined weight of sample in air at 773 K. for 24 hours. The total oxygen content of each sample could then be determined by differences. The ashes were fused with potassium hydrogen sulfate and the mixture was dissolved in water. Their composition was determined by a Direct Current Plasma Emission Spectrometer-Spectrospan #5, manufactured by Beckman Instruments.

Measurement of pH: 1 gram of sample was mixed with about 125 ml of distilled water. The resulting slurry was boiled in an atmosphere of nitrogen for about 20 minutes until the final volume was 100 ml. This mixture was cooled in nitrogen to room temperature. The pH values were measured by a Fisher Accumet 480 pH meter after its equilibrium was reached under nitrogen flow. Such a procedure prevents dissolution of atmospheric carbon dioxide from affecting the measurement of pH.

Basic and Acidic Solution Adsorption: To evaluate the acidic and basic properties of each of the modified activated carbons, two one-gram samples were placed in two separate conical flasks containing 50 ml of 0.02M solution of sodium hydroxide or hydrochloric acid. The flasks were gently shaken for 24 hours on a Model 75 Wrist Shaker manufactured by Burrell Corporation. The amount adsorbed of each reagent was determined by back titration of 10 ml of clear solution.

Surface Area: The nitrogen BET surface areas were obtained on a Quantachrome Quantasorb system at liquid nitrogen temperature using a 15% nitrogen helium mixture of primary standard grade supplied by Linde Gas Company.

In Table 1, the results of elemental analysis and surface areas for the various supplies are presented. The oxygen content (i.e., bonded to the carbon) of all the samples is generally high. Surface areas are between 1000–1500 $m^2/gm$ except for sample 9 which shows a lower surface area (713 $m^2/gm$) and higher ash content (18.56%). Table 2 shows the pH of the sample carbons before and after water and acid wash.

FIG. 1 is a plot of carbon pH versus total ash content that results for each sample after washing treatments in water and acid referenced to the pH of the as received carbon. It is observed in FIG. 1 that washing procedures with water or acid reduce the ash content and pH values of the carbon samples. This demonstrates that the pH of most commercial carbons is affected by the inorganic ingredients originating in the source materials or added during manufacture.

As apparent in FIG. 1, for the activated carbon samples studied, the results can be divided into two general groups: (i) With low ash content (samples 1–4; group A) and (ii) With high ash content (samples 5–9). The second group can be separated into two sub-groups showing high pH (samples 5–7; group B) and samples showing low pH (8 and 9). All samples show a decrease in pH and ash content when treated with water and hydrochloric acid The dependence of pH change due to washing is different for each carbon. Group-A, of low ash content, shows that the ash content is significantly reduced (by 50–80%) by washing, and the resulting pH change is also larger ($\Delta pH \sim 3$). On the other hand, carbons of high ash content are less affected by washing, i.e., the extent of ash reduction is comparatively small (less than 20%) and their pH changes are small as well ($\Delta pH \sim 1$).

Table 3 tabulates the composition of ash for all the as-received samples. Group-A carbons are rich in alkalinic metals (potassium is not listed) while the other carbons have high content of iron and silicon that can form insoluble complexes. It is interesting to note that group-A carbons are made of the same source material, namely coconut shell, and group-B are all from bituminous coal; carbons 8 and 9 are from wood and lignite coal, respectively. It appears that some characteristics from the parent materials are imprinted on succeeding activated carbons.

The presence of the ash also appears to have some role in forming surface functional groups under oxygen treatment as will be discussed.

To study the effect of washing and hence removal of ash on subsequent gaseous surface modification procedures, more extensive treatments were carried out on three activated carbon samples. These samples were, after washing, reduced and/or oxidized under different conditions as outlined earlier. The Oxidation intensity is an arbitrary parameter that accounts for the temperature, time and oxygen partial pressures used during the oxidation treatment. Oxity is defined as:

Oxidation Intensity $(\text{Oxity}) = \log[1 + tP_{02}\exp(T/400 - 1)]$ Reasonable assumptions were made in formulating this empirical expression. An increase in oxidation intensity occurs with an increase in the oxidation variables: time exposed to the oxidation treatment (t, min.), partial pressure of oxygen ($P_{02}$, %), and oxidation temperature (T,K). The functional forms of each variable are not known. However, the reaction rate of carbon with oxygen is first-order in oxygen pressure. The extent of the reaction is then proportional to the product of time and oxygen concentration. The temperature effect in the reaction rate constant is an exponential function. These relationships between variables were considered in formulating the expression for the oxidation intensity (defined as oxity).

The titer-acidity is initially negative, i.e., the carbon samples have a larger number of basic groups independent of washing procedure or total ash content. As oxity increases the net acidity increases and the relative change depends upon the carbon and the washing procedure. In some cases, the net acidity is negative or approximately zero even for the most intensive oxidation cycle.

The effect of ash content on the surface properties of activated carbons was examined. The titer-acidity and carbon pH in aqueous suspension provide complementary information of the impact of ash on the quantity and quality of acid sites generated on the carbon surface following controlled oxidation. Washing procedures establish templates for these oxidation cycles. We have previously shown that in the case of hydrogen adsorption, carbons with higher titer-acidity show higher adsorption capacity. Furthermore, hydrogen uptake can be correlated with surface area and the pH of the carbon raffinate. When the end use of the carbon is as an adsorbent for hydrogen storage, it was previously believed that the more acidic the surface of the carbon, the greater will be its adsorption capacity, all else being equal. On the other hand, the results herein pose additional factors that must be considered. These are the total ash content and the strength of the acid or base sites. The basis for assessing acid strength or base strength is by a determination of the carbon pH. Washing procedures reduce the pH of the carbon and this reduction depends on the severity of washing (water or acid) and on the total ash content. Washing procedures establish a template on the carbon surface for subsequent oxidation cycles. Ash remaining on the carbon during these procedures can serve as "catalysts" to promote desired acid or base functionalities during oxidation.

Considering the ash content data and the washing procedures used prior to oxidation a consistent interpretation emerges. Sample #1 had the lowest ash content ($\sim 1\%$). Water washing appears to be sufficient to induce the proper template to increase both the quantity and quality of acid sites. Acid washed samples of this carbon show approximately the same titer-acidity and pH at the highest oxity as the water washed sample. On the other hand, for sample #2, containing higher ash content ($\sim 2\%$), water washing does not appear to be sufficient to establish the proper template for subsequent oxidative surface modification. However, after acid washing the titer-acidity and pH are affected by increasing oxity and, in fact, the final values are remarkably close to those of sample #1. Sample #7 contains the highest amount of ash content ($\sim 8\%$). Neither water nor acid washing appear to be severe enough to engender the same effect seen for samples #1 and #2. Although the titer-acidity (quantity) does increase to a value close to that of the samples when they have been properly pretreated, the quality (chemical speciation) does not appear to change significantly, remaining neutral ($pH \sim 7$) independent of oxity. This implies that although the net acidity of the carbon increases, the increase in the acid functionality must be due to weak acids.

In view of the above, there is a clear impact of ash content on the oxidative generation of acid functionalities on carbon surfaces. A complete knowledge of the ash analysis may provide an explanation of mineral species responsible for those characteristics discussed above. For example, alkali and alkaline earth elements and transition metals are found to catalyze coal gasification; they are also the primary constituents of the ash. The alkaline earth metals like Ca do not affect the apparent activation energy of $CO_2$,$H_2O$ gasification. Their catalytic effects are attributed to a increase in active sites on the carbon surface. On the other hand, the alkali metals reduce the activation energy and an increase in the catalyst loading does not result in further changes in the apparent activation energy, but in their number of active sites. Transition metals affect the activation energies for gasification. It is evident that different mineral species have different effects on the surface reactions of carbons. Thus, their oxidation characteristics may be changed depending upon the degree of ash removal by water or acid washing.

Another possible explanation of the observed impact of these "catalytic" ash elements could be considered in terms of a rake mechanism. Here the introduction of a "catalyst" can alter the selectivity of the oxidation reaction by changing the heat of adsorption of intermediates participating in a reaction where a series of successive intermediates are each oxidized to a greater extent. If we consider a carbon-hydrogen precursor denoted as $(CH_x)$ on the surface prior to oxidation then a rake sequence could be written as $$(CH_x)-(CH_{x-1})-(CH_{x-2})- \ldots$$

Successive abstraction of H atoms leads to a "rake" of adsorbed species. This concept suggests the possibility of modifying reaction selectivity by modification in "catalyst" composition (e.g., by washing) so as to enhance the selectivity toward the desired intermediate.

In either case described above, it is apparent that certain ash elements can serve as catalytic sites that can produce an optimal acidic or basic functionality. Low ash content coconut-based carbons appear to have mineral matter that leads to the generation of such sites. On the other hand, higher ash content coal-derived carbons contain mineral matter that leads to more complete oxidation of surface groups or in a volatile compound (CO or $CO_2$). It is likely that the amount, location and chemical composition of each constituent in the ash is of some significance. Modification of this catalytic agent appears to be crucial and determined by the ash content and the severity of washing.

Figure 2:
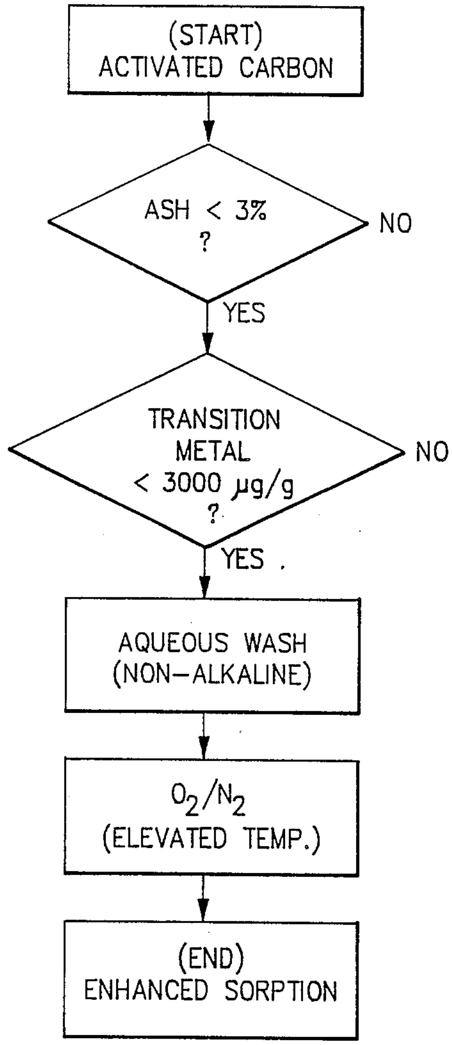
FIG. 2 is a flow chart explaining the basic principles of the present invention.

The selection technique of the invention can be summarized generally with reference to the Flow chart of FIG. 2. To start, a sample of each activated carbon is analyzed. If it has an ash content below about 3 percent and if its transition metal content is below about 3000 μg/g, it is subjected to an acid aqueous wash or a neutral wash, and then is treated with a flow of oxygen and an inert gas such as nitrogen, at an elevated temperature. This creates acid or basic functional sites on the carbon, leading to an end product with significantly enhanced sorption properties.

While the above invention has been described in detail here with reference to a preferred embodiment it should be apparent that the invention is not limited to that precise embodiment, but that many modifications and variations would present themselves to those of skill in the art without departure from the scope and spirit of the invention, as defined in the appended claims.

What is claimed is:

1. A method of preparing an activated carbon for enhanced sorption of hydrogen or a hydrogen-containing gas, comprising the steps of selecting a source carbon material that has a low ash content on the order of 3% or less and whose ash content contains a relatively small silicon content on the order of 1000 μg/g or less and a relatively small transition metal content on the order of 3000 μg/g or less, and whose ash content predominantly consists of alkali metals and/or alkali earths;

washing the selected source carbon in an aqueous nonbasic wash to reduce said ash content and to reduce the pH of the carbon;

treating the washed carbon in a flow of oxygen and an inert gas at an elevated temperature to create acidic or basic functional sites on said carbon.

2. The method of claim 1 wherein said aqueous wash is a water wash.

3. The method of claim 1 wherein said aqueous wash is and aqueous solution of a strong acid.

4. The method of claim 3 wherein said washing is carried out by boiling the carbon in the aqueous acid solution.

5. The method of claim 1 wherein said treating in a flow of oxygen includes oxidizing in a mixture of oxygen in nitrogen at a temperature of substantially 873 K. or higher.

6. The method of claim 5 wherein said mixture is 1% oxygen in nitrogen an is carried out between 873 K. and 973 K.

7. The method of claim 1 wherein said treating in a flow of oxygen includes oxidization in flowing air at an elevated temperature of substantially 693 K. or below.

8. The method of claim 7 wherein said oxidation is carried out at a temperature of 653 K. to 693 K.

9. The method of claim 1 further comprising subjecting the treated carbon to a reducing hydrogen flow at elevated temperatures.

10. The method of claim 1 wherein said treating in a flow of oxygen includes oxidation in an oxygen/nitrogen mixture at a temperature on the order of 448 K.

* * * * *

UNITED STATES PATENT AND TRADEMARK OFFICE
CERTIFICATE OF CORRECTION

PATENT NO. : 4,960,450
DATED : October 2, 1990
INVENTOR(S) : Schwarz, et. al.

It is certified that error appears in the above—identified patent and that said Letters Patent is hereby corrected as shown below:

At column 1, line 4, please insert:

-- This invention was made with government support under Grant No. 186193-S awarded by the U.S. Department of Energy - Brookhaven Labs. The Government has certain rights to this invention.--

Signed and Sealed this

Nineteenth Day of October, 1993

Attest:

BRUCE LEHMAN

*Attesting Officer*

*Commissioner of Patents and Trademarks*